United States Patent [19]

Giacomini

[11] Patent Number: 4,893,644
[45] Date of Patent: Jan. 16, 1990

[54] NON-RETURN VALVE FOR SUPPLY COCKS

[75] Inventor: Marco Giacomini, Novara, Italy

[73] Assignee: Sirio S.p.A., Italy

[21] Appl. No.: 239,134

[22] Filed: Aug. 31, 1988

[30] Foreign Application Priority Data

Sep. 4, 1987 [IT] Italy ................................ 21799 A/87

[51] Int. Cl.$^4$ ............................................ F16K 24/00
[52] U.S. Cl. ................................ 137/218; 137/512.15; 251/360
[58] Field of Search ................. 137/102, 218, 512.15; 251/360

[56] References Cited

U.S. PATENT DOCUMENTS

| 2,270,737 | 1/1942 | Langdon | 137/218 |
|---|---|---|---|
| 2,322,631 | 6/1943 | Groeniger | 137/218 |
| 2,328,382 | 8/1943 | Langdon | 137/218 |
| 2,382,427 | 8/1945 | Langdon | 137/218 |
| 2,663,309 | 12/1953 | Filliung | 137/218 |
| 2,675,823 | 4/1954 | Langdon | 137/218 |
| 2,746,477 | 5/1956 | Krause et al. | 137/218 |
| 2,875,776 | 3/1959 | Skipwith, Jr. | 137/218 |
| 2,897,835 | 8/1959 | Philippe | 137/218 |
| 2,940,464 | 6/1960 | Moen | 137/218 |
| 2,997,054 | 8/1961 | Woodford | 137/218 |
| 3,023,767 | 3/1962 | Woodford | 137/218 |
| 3,155,107 | 11/1964 | Woodford | 137/218 |
| 3,459,443 | 8/1969 | Butters et al. | 137/218 X |
| 3,543,786 | 12/1970 | Woodford | 137/218 |
| 3,670,760 | 6/1972 | Butcher et al. | 137/218 |
| 3,850,190 | 11/1974 | Carlson | 137/218 |
| 4,080,981 | 3/1978 | Stewart | 137/218 |
| 4,669,497 | 6/1987 | Tenhengel | 137/218 |

Primary Examiner—John Rivell
Attorney, Agent, or Firm—Kirschstein, Ottinger, Israel & Schiffmiller et al.

[57] ABSTRACT

A non-return valve for supply cocks, comprising an integral cup-shaped valve body (8) accommodating a substantially rigid washer (14) forming a seal with respect to the supply cock (2) and having flow apertures (16), as well as a flexible membrane (15) located underneath and self-positioning, during closure, against the said substantially rigid washer (14) so as to close the said flow apertures (16) of the same (14) and move away from the said flow apertures (16) under the pressure of the water supplied. The substantially rigid washer (14) and the flexible membrane (15) may advantageously be joined together so as to form a composite washer (28). The valve (1) proposed has a small number of components and can be very easily assembled. The substantially rigid washer (14), or the composite washer (28), has an external thread (14a)so that the said washer (14; 28) can be screwed into the thread (8b) of the cup-shaped portion (8a) of the valve body (8).

14 Claims, 3 Drawing Sheets

NON-RETURN VALVE FOR SUPPLY COCKS

BACKGROUND OF THE INVENTION

1. Field of the Invention

The present invention relates to a non-return valve for supply cocks.

2. Description of Related Art

Valves of the type mentioned are used in conjunction with supply cocks for flexible hosepipes used, for example in the fruit and vegetable sector, in flower growing and the like, or for washing purposes, for example in garages and the like, the said valves constituting valves for preventing contamination of the water supply. The said valves in fact prevent the water supplied from flowing in the opposite direction, i.e from the pipe used for watering, washing or the like, back into the water supply network. As is known, such a return flow would occur if there were a drop in pressure in the water supply upstream of the supply cock (due, for example, to an excessive demand), as a result of which the water inside the pipe, which may be immersed in a full storage tank, would flow, together with the impurities in it, back into the water supply network and contaminate the latter.

The known non-return valves comprise a cover part and a valve-body part. The cover part is in the shape of a cup threaded internally, for joining to a supply cock, and in the bottom of the same there are apertures through which the water to be supplied passes. At the bottom, there is also a seal cooperating with the supply cock. The cover part is also provided with a screw for fixing it to the cock and also has an external thread for screwing it inside the valve body. The latter has the shape of an upturned cup and contains the various operating parts of the valve. The said parts comprise first of all a flexible annular washer supported in a seat at a distance from the bottom of the valve body and designed to cover the said supply apertures and, under the pressure of the water supplied, to uncover the same by resting on an underlying sealing collar. The water supplied thus comes up against the end of a piston-type obturator located underneath and supported movably during opening and against a positioning spring during closure. The constricted base of the valve body is also provided with apertures for discharging the return water, which is discharged externally.

The valves of the known type therefore have a design which requires a large number of components as well as numerous operations for manufacturing the latter. Several washers are also required. Assembly of the individual components involves a large number of operations. The production costs are therefore rather high. The piston-type obturator also reduces considerably the working cross-section of the outlet aperture of these known non-return valves. The said obturator also requires special features to ensure that it is guided perfectly as well as the use of a special closing spring.

Since, for trouble-free operation of these known valves, a movable obturator must be correctly positioned and guided, it is obvious that the presence of impurities in the water, such as grains of sand and the like, could lead to blocking and incorrect positioning of the said obturator.

SUMMARY OF THE INVENTION

The object of the present invention is to provide a non-return valve which is able to overcome the drawbacks and deficiencies of the known valves mentioned above and is also able to simplify substantially the manufacture of the components of the same, simplifying also their assembly, while ensuring perfect operation and an outlet aperture $substantially equal to the supply aperture of the cock.

The object of the invention is also to provide non-return valves comprising a drastically reduced number of components and washers, so that the manufacturing costs are substantially reduced.

The non-return valve according to the invention is characterized by the features described in the characterizing part of claim 1.

Further structural features of the same are described in the characterizing parts of the subsequent claims.

According to the teaching of the present invention, therefore, the non-return valve proposed consists solely in an integral valve body accommodating a single washer and a single flexible membrane, which can be joined together to form a composite washer.

The proposed valve has several advantages.

The valve body is made as a single piece, for example from hot-pressed brass or plastic, in which the apertures for discharging the return water are directly formed during the pressing operation. The known tubular cover is therefore eliminated, and the fixing screw, if provided, is accommodated directly inside the valve body.

The water supply apertures are provided directly in the substantially rigid washer acting advantageously as a seal with respect to the supply cock.

The flexible rubber membrane cooperates directly with the said substantially rigid washer and, in its rest position, rests automatically against the said substantially rigid washer, closing the flow apertures for the supply water. Under the pressure of the supply water, this flexible membrane moves freely downwards, thus freeing the path of the water supplied in the direction of the valve discharge aperture.

The substantially rigid washer and the flexible rubber membrane may advantageously be rigidly joined together so as to form a composite washer. This simplifies assembly further. This composite washer, or substantially rigid washer, may have advantageously an external thread so that there is provision for a screw-type joint of a specific nature, i.e. with a predetermined pressure, between the said substantially rigid or composite washer and the valve body.

Advantageously the substantially rigid washer, or the composite washer, have, externally, incisions for preventing unscrewing.

Both the substantially rigid washer and the flexible membrane, which can be made of rubber, plastic or the like, may advantageously be profiled on their external faces so as to have annular sealing projections. This enables individual sealing components to be eliminated.

Assembly may advantageously be performed automatically and involves substantially a single assembly operation.

Since there is a very small number of components and the existing components can be produced with a very limited number of manufacturing operations, the overall production costs will be extremely low.

The outlet aperture of the proposed valve is not closed by moving parts (obturator) and corresponds substantially to the aperture of the supply cock.

Operation is trouble-free and extremely reliable whatever the pressure either of the water to be supplied or of any return water and is not affected by the presence of grains of sand in the water.

BRIEF DESCRIPTION OF THE DRAWINGS

Further advantages, characteristics and details of the non-return valve according to the invention will emerge more clearly from the following description, with reference to the accompanying schematic drawings in which:

FIG. 1 is a view of an example of use of the non-return valve according to the invention in a watering plant, washing plant or the like;

DETAILED DESCRIPTION OF THE PREFERRED EMBODIMENTS

In the various figures, shown on different scales so that they can be more clearly understood, identical or corresponding parts have the same reference numbers.

Figure 1:
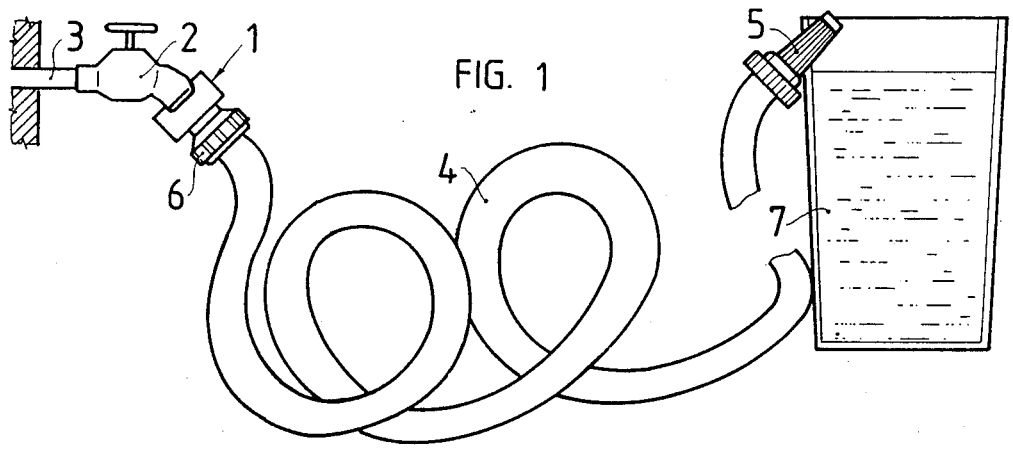

FIG. 1 shows, by way of example, a watering plant or the like, in which the non-return or anticontamination valve according to the invention is indicated in its entirety by 1. The said valve is fixed to a cock 2 arranged on a water supply mains 3. 4 denotes a flexible pipe having at its free end, in the example shown, an adjustable nozzle 5. The flexible pipe 4 is fixed to the non-return valve 1, in a manner known per se, by means of a threaded ring 6 with an associated connection piece (not shown in greater detail) attached to the flexible pipe 4. 7 denotes a water storage container or tank, as frequently used, for example, in gardens or the like.

Figure 2:
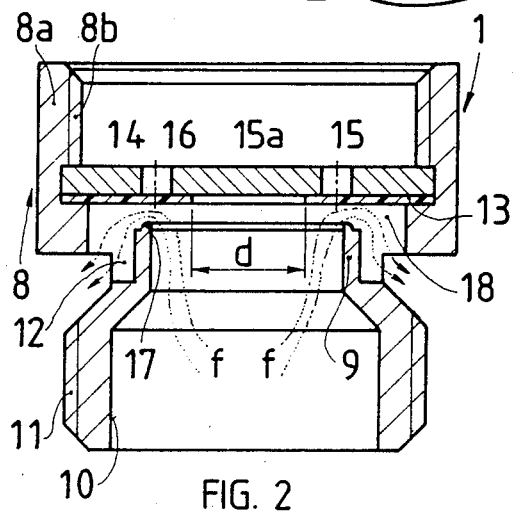
FIGS. 2 and 3 are in each case a vertical center section through a non-return valve according to the invention and, more precisely, in FIG. 2, with the valve in the rest position, i.e. with the cock closed and, if applicable, a flow of return water and, in FIG. 3, with the valve in the operating position, i.e. with the supply cock open.

The non-return valve 1 according to the invention consists of an integral cup-shaped valve body 8 having a cup-shaped portion 8a threaded internally 8b for screwing onto the cock 2 and a constricted base 9 with a connecting portion 10 externally threaded at 11 for fixing the above mentioned threaded ring 6. 9a denotes the through-aperture of the base 9. At the top, the valve body 8 may have a screw (not shown in greater detail) for fixing the said body to the cock 2. Moreover, inside the valve body 8, 12 denotes the apertures for discharging any non-return water, while 13 denotes a seat or constriction for accommodating a substantially rigid washer 14 and a flexible annular membrane 15 which is able to position itself against the washer 14. The washer 14 has in it the appropriate flow apertures 16 located along a circumference with a diameter D. The diameter d of the central hole 15a in the flexible washer 15 is considerably smaller than the diameter D of the circumference of the flow apertures 16 so as to ensure that the latter are closed perfectly by the self-positioning flexible membrane 15, as shown in FIG. 2. In the example shown in FIGS. 2 and 3, in the region of the internal aperture 9a provided in the base 9 of the cupshaped body 8, there is an annular projection 17, the purpose of which is to prevent tearing of the flexible membrane 15 when the latter, during the supply of water, rests against the said internal aperture 9a. Finally, 18 denotes the discharge chamber which is formed between the lower surface of the above mentioned flexible membrane 15 and the inner side of the constricted base 9 of the cup-shaped body 8.

Figure 4:
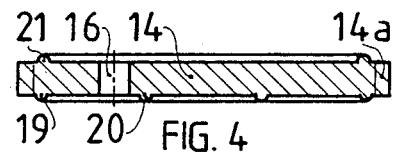
FIG. 4 is a vertical center section through a first variation of the substantially rigid washer according to the invention.
Figure 5:
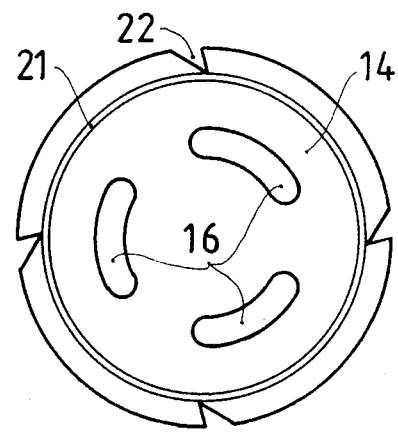
FIG. 5 is a top view of the washer shown in FIG. 4.
Figure 6:
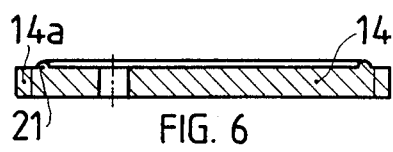
FIGS. 6 and 7 are, respectively, a vertical center section through a substantially rigid washer (FIG. 6) and a flexible membrane (FIG. 7) in a further embodiment thereof.
Figure 7:
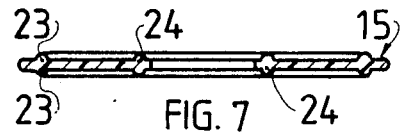

In a first variation, indicated in FIGS. 4 and 5, the substantially rigid washer 14 is made of plastic and has two small annular shoulders 19 and 20 on its lower side, as well as a small annular shoulder 21 on its upper side. In general, the washer 14 is advantageously provided with an external thread 14a so that it can be screwed into the internal thread 8b of the valve body 8. In FIG. 5, 22 denotes tangential incisions in the shape of sawteeth, the purpose of which is to prevent, after the said washer 14 has been screwed in, any unwanted unscrewing of the same. The shoulder 21 acts as seal cooperating with the supply mouth of the cock 2, while the lower shoulders 19 and 20 cooperate with the flexible rubber washer 15 located underneath, which is flat. The annular shoulder 19 provides an external seal, whereas the annular shoulder 20 forms an internal seal. Advantageously, the internal shoulder 20 may be higher than the external annular shoulder 19. Reference will now be made to FIGS. 6 and 7 showing a further variation of embodiment of the washer 14 and the membrane 15. FIG. 6 shows that the washer 14, which is also advantageously made of plastic, has an external thread 14a and is provided solely with the upper annular shoulder 21. The bottom side of the washer 14 is smooth. The projections in the form of annular shoulders are also provided on the flexible membrane 15, the said annular shoulders being indicated by 23 and 24 and being provided on both faces of the said flexible washer 15, such that the latter may be associated with the washer 14 indifferently on one side or the other. Moreover, the shoulder-shaped internal rib 24 provided on the bottom side of the washer 15 may simply replace the annular projection 17 formed on the valve body 8 and thus simplify further the design of the latter.

Figure 8:
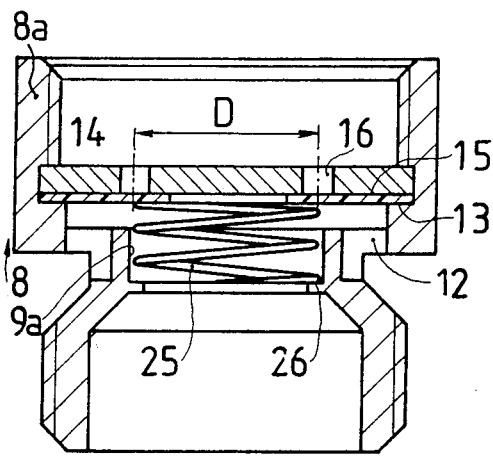
FIG. 8 is a center section, similar to FIGS. 2 and 3, of a variation of embodiment of the proposed valve with a positioning spring.

In the embodiment shown in FIG. 8, 25 denotes a spring accommodated on a seat formed in the neck 26 of the aperture 9a in the valve body 8. This spring 25 assists self-positioning of the membrane 15 so as to close the flow apertures 16.

Figure 9:
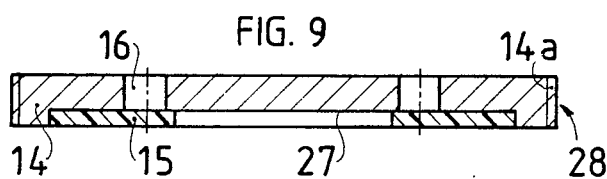
FIGS. 9 to 11 are further vertical center sections through further variations of the substantially rigid washers.

In the variation shown in FIG. 9, the flexible membrane 15 is accommodated in a seat 27 of the substantially rigid washer 14 and forms together with it a composite washer 28. When the latter is clamped against the cock, the flexible membrane 15 is not thereby subjected to the clamping pressure and retains its self-positioning capacity.

Figure 10:
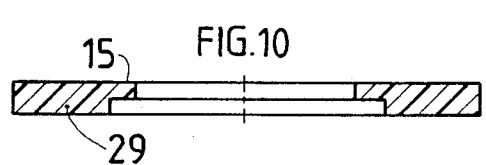
Figure 11:
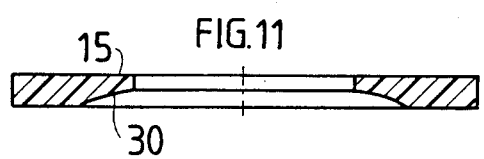

In the variation shown in FIG. 10, an annular enlarged portion 29 is provided on the bottom side of the flexible membrane 15. The said enlarged portion will rest directly on the seat 13 or, where appropriate, directly on the constricted base 9 depending on the height of the said enlarged portion 29. In this case also, the clamping pressure of the valve 1 on the cock 2 will not affect the self-positioning capacity of the flexible membrane 15. This self-positioning capacity may be assisted, moreover, by the addition of material, as indicated, for example, by 30 in FIG. 11.

Figure 12:
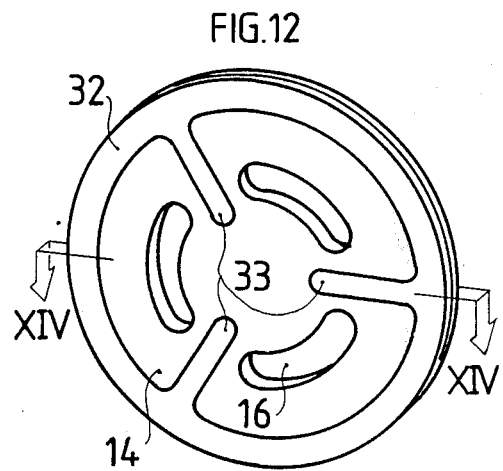
FIGS. 12 and 13 are a top view and bottom view of a further variation of the substantially rigid washer.
Figure 14:
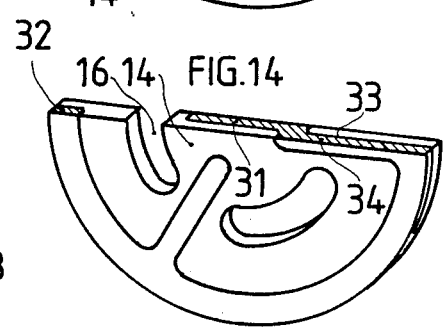
FIG. 14 is a vertical center section through the washer shown in FIG. 12, along the sectioning plane XIV—XIV.
Figure 13:
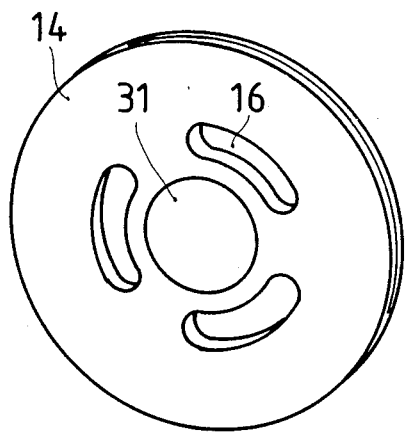

In the variations shown in FIGS. 12 to 14, the bottom side of the substantially rigid washer 14 has, formed in it, a circular layer of rubber 31 with which the flexible rubber membrane 15 cooperates so that there is an optimum rubber-on-rubber sealing effect. For reasons connected with the pressing or moulding operation, this variation of embodiment has an annular pressing or moulding channel 32 and radial slots 33 with a vertical section 34 leading, at the bottom, into the seat formed in the above mentioned rubber disk 31.

Figure 15:
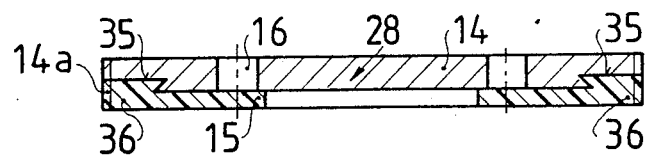
FIG. 15 is a vertical center section through a composite washer according to the invention.
Figure 16:
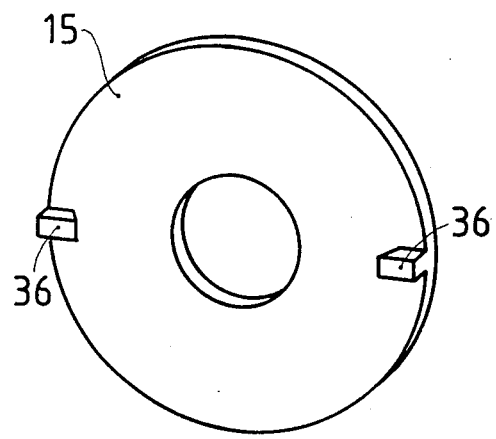
FIG. 16 is a perspective view of the upper side of the flexible membrane used in FIG. 15.
Figure 17:
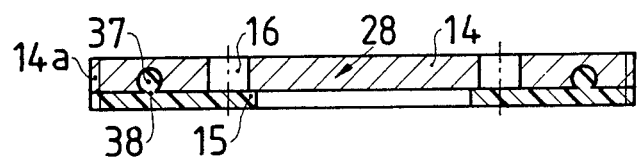
FIG. 17 is a vertical center section, similar to that of FIG. 15, through a different embodiment of the composite washer.
Figure 18:
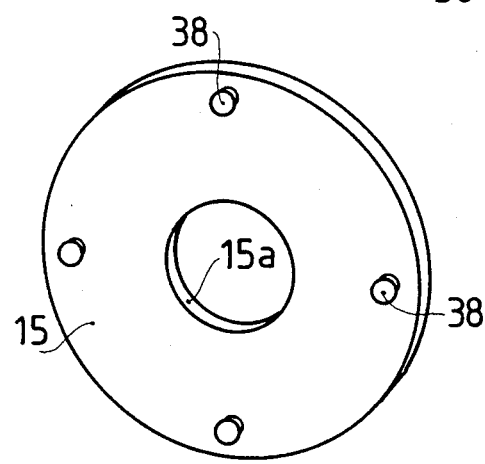
FIG. 18 is a perspective view of the flexible membrane used in FIG. 17.
Figure 19:
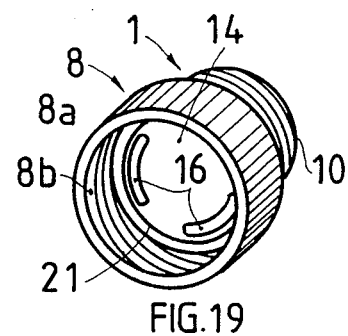
FIG. 19 is a perspective view of the non-return valve according to the invention.

In the embodiments shown in FIGS. 15 to 18, the substantially rigid washer 14 and the flexible membrane 15 are removably joined together so as to form composite washers 28. In FIG. 15, the substantially rigid washer 14 has two seats 35 for accommodating two tooth-shaped protrusions 36 formed on the flexible membrane 15, for example opposite each other as shown in FIG. 16. In FIG. 17, a plurality of substantially bell-shaped seats 37 are provided in the substantially rigid washer 14 and are intended for accommodating a plurality o correspondingly shaped projections 38 formed on the flexible membrane 15. A single annular seat could be provided in place of the plurality of seats 37, in which case a correspondingly shaped shoulder could be provided in place of the bossshaped projections 38. In the embodiments shown in FIGS. 15 to 18, the external perimetral part of the flexible membranes 15, adjacent to the thread 14a of the substantially rigid washer 14, acts advantageously as a device for preventing unscrewing, together with or as an alternative to the incisions preventing unscrewing, shown in FIG. 5.

Operation of the anti-contamination valves according to the invention can be clearly understood from the above structural description. When the supply cock 2 is closed, the flexible membrane 15 will position itself against the substantially rigid washer 14 and will close the flow apertures 16 of the latter. This position, shown in FIG. 2, also corresponds to the position which would be assumed in the event of return water flowing out, as indicated by the arrows f shown in broken lines in FIG. 2. This water will thus tend to make the flexible membrane 15 adhere more firmly against the rigid washer 14 before flowing out from the discharge apertures 12.

Figure 3:
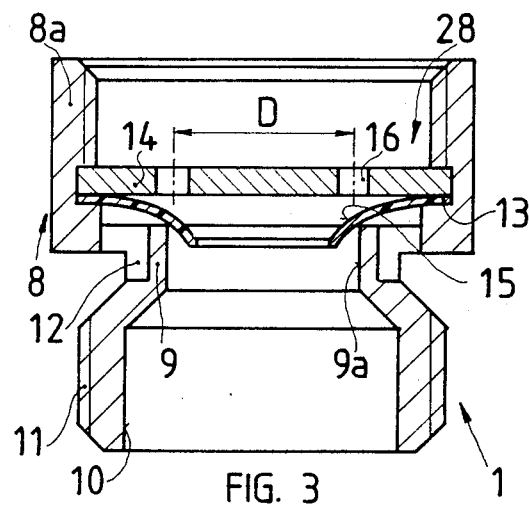

When water is supplied, the pressure of the water flowing out from the flow apertures 16 will press the flexible membrane 15 downwards to a greater or lesser extent, depending on the pressure and quantity of water supplied (FIG. 3). When the supply cock 2 is opened, the membrane 15 will come into contact against the annular projection 17 on the base 9 of the valve body 8 or against the said base 9 via its own projecting rib in the form of a small annular shoulder 24, as shown in FIG. 7. When the water supply is interrupted, the flexible membrane 15 will re-position itself automatically, owing to the re-positioning "memory" of the material used, against the substantially rigid washer, as shown in FIG. 2. This operation may also be assisted, in practice, by an annular spring 25, as shown in FIG. 8.

From the above description it can be clearly seen that, with a non-return or anti-contamination valve according to the invention, the object of the invention is effectively achieved and the advantages mentioned in the introductory part are obtained. In particular, the manufacture of these valves is simplified considerably and the number of components in such valves is drastically reduced. Apart from a movable obturator, the valve body may advantageously be made as a single piece. The substantially rigid washer 14 and flexible membrane 15 may be advantageously joined together in an extremely simple manner, and the said parts may be designed as illustrated above so as to perform additional functions achieved, in the known valves, by means of specific components. Assembly, with the substantially rigid washer and flexible membrane independent of each other or joined together, may be performed in a single assembly operation, whereby advantageously the substantially rigid washer is joined as such, or in a composite arrangement, to the valve body by means of screwing.

In practice, all the individual parts may be replaced by other technically and/or functionally equivalent parts, without however going outside the scope of the present invention. The dimensions and materials may also be chosen as required, depending on the particular case and measurements considered. In order to achieve a more specific response behavior or self-positioning, inserts, for example annular inserts, made of harder rubber or sheet metal, or annular inserts in the form of wires folded in a Greek pattern, etc. could be incorporated in the body of the flexible membrane. The present invention also includes use of the valve proposed for any liquid and plant in which the said valve can be used in the manner illustrated.

In practice, all the features evident from the description, the claims and the drawings are considered fundamental for the present invention, both individually and in the various combinations illustrated and mutually realizable as required.

I claim:

1. A non-return valve for water supply cocks, comprising:
   (a) a one-piece, elongated, tubular, valve body having a cup-shaped portion at an inlet end and an integral base at an opposite outlet end, said cup-shaped portion having an interiorly threaded section for connection to a water supply cock, said base having an exteriorly threaded section for connection to a hose coupling, said base and cup-shaped portion bounding a passage along which water from the inlet end flows in one direction to the outlet end, said base and cup-shaped portion bounding therebetween a bypass channel open to the exterior of the valve;
   (b) a substantially rigid washer separate from, and mounted within, the cup-shaped portion and having one surface for sealing engagement with the cock, an opposite surface, and apertures extending through the washer surfaces; and (c) a flexible annular membrane mounted within the cup-shaped portion adjacent the washer, said membrane having an outer peripheral section stationarily mounted in a fixed position by the washer, and an inner movable valve portion having a central hole, said valve portion being movable from an open position in which the valve portion is positioned by water flowing along said one direction away from the washer and permits water to flow along the passage through the apertures and the central hole to the outlet end, to a closed position in which the valve portion is positioned against the washer and blocks the apertures, thereby routing return water flowing in the return direction opposite to said one direction into the bypass channel to the valve exterior.

2. Non-return valve according to the claim 1, wherein the substantially rigid washer and the flexible membrane are joined together and form a composite washer, the substantially rigid washer having seats for accommodating corresponding portions of the flexible membrane.

3. Non-return valve according to claim 2, wherein the washer has an external thread for connection to the cup-shaped portion, and sawteeth incisions are provided, as means for preventing unscrewing, on the external circumference of the washer.

4. Non-return valve according to claim 1, wherein the substantially rigid washer and the flexible membrane are accommodated inside a constricted seat formed in the cup-shaped portion of the valve body, at a short distance from the base of the cup-shaped portion.

5. Non-return valve according to claim 1, wherein the substantially rigid washer has, integral therewith, on the upper side of the same, a small sealing shoulder cooperating with the supply cock and, on the bottom, two small concentric sealing shoulders cooperating with the flexible membrane located underneath.

6. Non-return according to claim 1, wherein the substantially rigid washer has on the top, integral therewith, a small sealing shoulder, while the flexible membrane has integral therewith, on both sides of the same, two small projecting sealing shoulders.

7. Non-return valve according to claim 1, wherein the flexible membrane is accommodated in a disk-shaped seat formed on the opposite surface of the substantially rigid washer.

8. Non-return valve according to claim 1, wherein the flexible membrane has, at the bottom, an annular enlarged portion which rests directly on a top side of the base of the cup-shaped portion of the valve body.

9. Non-return valve according to claim 1, wherein the flexible membrane has, at the bottom, an annular enlarged portion with additional material for improving the self-positioning capacity of the membrane itself.

10. Non-return valve, according to claim 1, wherein an underlying seat of the substantially rigid washer has, formed in it, a rubber layer cooperating with the flexible membrane so as to produce a rubber-on-rubber seal.

11. Non-return valve according to claim 1, wherein the flexible membrane has two diametrically opposed, tooth-shaped projections which are accommodated in corresponding seats formed in the substantially rigid washer.

12. Non-return valve according to claim 1, wherein the flexible membrane has mushroom-shaped projections, while the substantially rigid washer has corresponding seats with a matching shape.

13. Non-return valve according to claim 1, wherein the valve body has a connecting portion formed with a neck, and accommodating a spring for urging the flexible membrane into the closed position against the substantially rigid washer.

14. Non-return valve according to claim 1, wherein the base has a raised rim provided with means for preventing tearing of the flexible membrane.

* * * * *